May 10, 1949.  A. A. SCARLETT ET AL  2,469,579
LIFT MECHANISM FOR DISK PLOWS
Filed Oct. 8, 1945  2 Sheets-Sheet 1
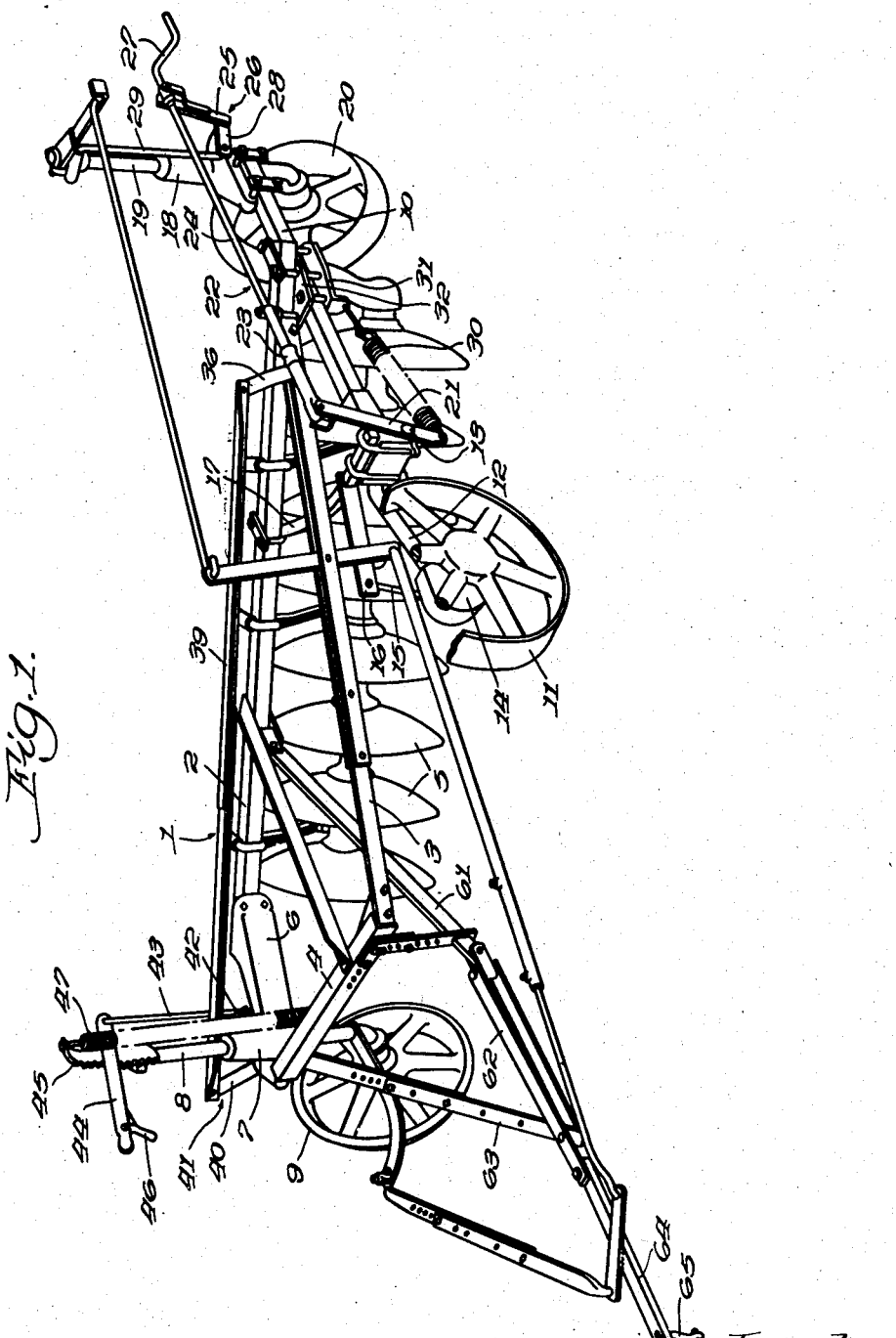
Inventors
Arthur A. Scarlett
and Howell N. James.
By Paul O. Pippel Atty.

May 10, 1949.  A. A. SCARLETT ET AL  2,469,579
LIFT MECHANISM FOR DISK PLOWS
Filed Oct. 8, 1945  2 Sheets-Sheet 2
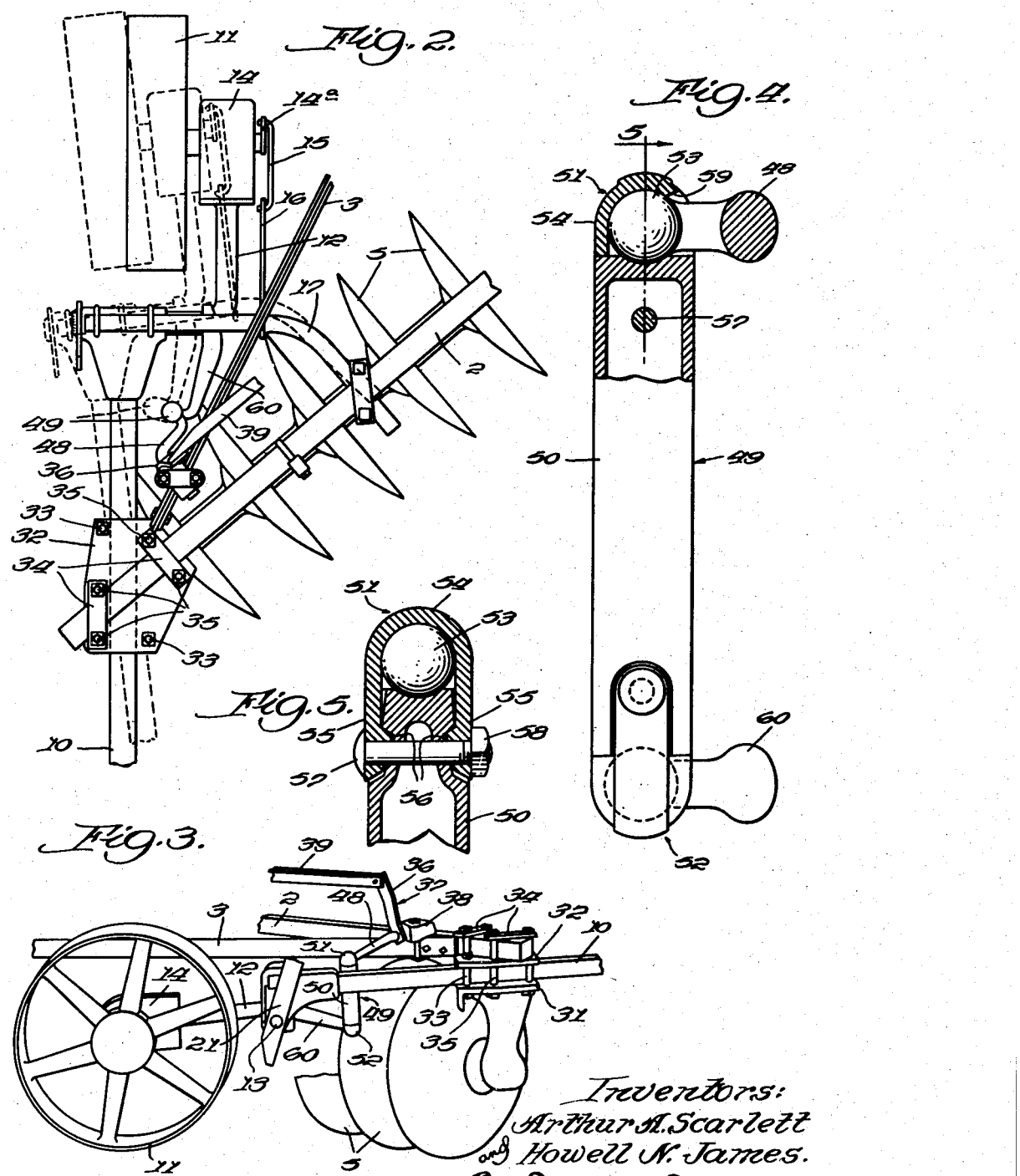

Patented May 10, 1949

2,469,579

UNITED STATES PATENT OFFICE 2,469,579

LIFT MECHANISM FOR DISK PLOWS

Arthur A. Scarlett and Howell N. James, Hamilton, Ontario, Canada, assignors to International Harvester Company of Canada, Limited, Hamilton, Ontario, Canada Application October 8, 1945, Serial No. 621,094

2 Claims. (Cl. 97—101)

This invention relates to agricultural implements, and more particularly to plows of the gang-type wherein disks or the like are mounted on a wheeled frame propelled by a tractor or other suitable source of power and adapted to be drawn therebehind. A plow of the type with which the present invention is concerned comprises generally a tool-carrying beam arranged diagonally to the direction of travel and supported at the front and rear by furrow wheels, the front wheel being arranged to ride in the previous furrow and the rear wheel in the new furrow made by the tools. The rear furrow wheel is often carried on a transverse truck at the other end of which and laterally spaced from the furrow wheels is a land-wheel. In such plows the tool frame is usually raised and lowered with respect to the supporting wheels by power derived from the land-wheel and transmitted to the other wheels. Since plows of this sort are generally large and heavy with considerable space both longitudinally and laterally between land and furrow wheels, the provision of satisfactory lift mechanism by which lifting power is transmitted from the land wheel to the furrow wheels has presented a problem difficult of solution. This difficulty has been aggravated by the not infrequent need for changing the width of cut of the tools. The width of cut in this type of plow is varied by changing the angle occupied by the tool-carrying beam with respect to the line of draft on the plow, by which the relative spacing between the front furrow wheel and the land and rear furrow wheels is also altered. This involves a change in the mechanism by which lift is transmitted from the land-wheel to the front furrow wheel, and an object of the present invention is the provision of novel means for transmitting power from a land wheel to a furrow wheel where the relationship therebetween is variable.

Another object is to provide an improved lifting connection between the land wheel and the front furrow wheel of a gang plow, wherein the land wheel is mounted upon a truck which is swingable to vary the spacing between the wheels.

Another object is to provide in a plow of the character described including a wheel supported frame which may be raised and lowered with respect to the wheels, a truck adjustable about a vertical axis with respect to the frame and carrying a land wheel, lift means deriving power from the land wheel and transmitted to the furrow wheel for raising the frame with respect to both land and furrow wheels, and connecting means between the land and furrow wheels accommodating relative horizontal movement of the truck and frame without interfering with the transmission of lifting power to the furrow wheel.

Other objects and advantages of the invention will become clear from the following detailed description when read in conjunction with the annexed drawings, wherein:

Figure 1 is a view in perspective of a harrow plow embodying the features of the present invention;

Figure 2 is a plan view of a portion of the rear end of the plow shown in Figure 1 and illustrating the mechanism by which the plow frame is lifted.

Figure 3 is an elevation similar to Figure 2 showing a portion of the mechanism by which lift is transmitted from the land wheel of the plow to the front furrow wheel;

Figure 4 shows a detail partly in section of a portion of the power transmitting mechanism; and Figure 5 shows a sectional detail of a portion of the structure shown in Figure 4.

Referring to the drawings, the plow of the present invention is provided with a frame generally indicated by the numeral 1, which includes a beam 2 extending transversely to the direction of travel of the plow, a side frame bar 3, and a front bar 4. Beam 2 has secured thereto and depending therefrom a gang of disks 5 adapted to open a furrow in the ground. The forward end of tool beam 2 has secured thereto a bracket in the form of a casting 6 having secured thereto a vertically extending sleeve member 7 having slidably and rotatably received therein a vertically extending spindle 8, the lower end of which is bent outwardly and provided with a furrow wheel 9. The rear end of tool beam 2 has adjustably secured thereto a generally transversely extending truck including a beam 10, upon one end of which is mounted a land wheel 11. Land wheel 11 is connected to the beam 10 by means of a crank axle 12 having a transverse portion 13 mounted for pivotal movement in the end of beam 10 and vertically swingable about its pivot to raise and lower the frame with respect to the wheel. Power for lifting the frame with respect to the land wheel is derived from the contact of the land wheel with the surface of the ground and actuated by a clutch 14 preferably of the well known half revolution type. Clutch 14 operates in a conventional manner to rotate a crank arm 14a (see Figure 2) through a half revolution with the rotation of land wheel 11. Crank arm 14a reacts through a link 15 against a strap 16 secured to a bar 17 affixed at one end to the beam 10 and at its other end to tool beam 2.

The other end of beam 10 opposite land wheel 11 has mounted thereupon a vertically extending sleeve member 18 which slidably and rotatably receives a vertically extending spindle 19, the lower end of which is bent outwardly in the manner of spindle 8 and has mounted thereupon a rear furrow wheel 20. Lifting power is transmitted from the land wheel 11 to the rear furrow wheel 20 through a lever arm 21 mounted upon the end of axle portion 13 extending outwardly from the end of beam 10. The upper end of arm 21 is bifurcated to receive for pivotal movement an adjustable connecting rod 22 comprising a sleeve portion 23 and a crank portion 24, the sleeve 23 being threaded to receive the threaded end of crank 24. The rear end of crank 24 is pivotally mounted upon an arm 25 of a bell crank 26 and is provided with a handle 27 by which the length of connecting rod 22 may be adjusted. The other arm 28 of bell crank 26 has connected thereto the lower end of a link 29, the upper end of which is pivotally secured to the upper end of the spindle 19. Thus operation of the clutch 14 to swing crank axle 12, carrying land wheel 11, with respect to the frame 1 is transmitted through connecting rod 22, bell crank 26 and link 29 to slide spindle 19 within sleeve member 18 to raise the rear end of the frame with respect to the rear furrow wheel 20. An adjustment of the position of furrow wheel 20 with respect to the frame may be made by manipulating the handlel 27. Lifting of the frame with respect to the furrow wheel 20 is assisted by a spring 30 connected to a depending portion of the lever 21 extending below its pivot at 13 and connected at its other end to a plate 31 which forms a part of the structure by which the beam 10 is adjustably secured to the tool beam 2.

Plate 31 engages the lower face of beam 10 and is secured to a plate 32 engaging the upper face of the beam 10 by means of bolts 33. The tool beam 2 is secured to these plates 31 and 32 by means of straps 34 and bolts 35 extending through both of the plates 31 and 32. It will be noted particularly well in Figure 2 that beam 10 is confined between bolts 33 and 35 on opposite sides thereof. It will also be observed that the spacing between the bolts 33 and 35 is greater than the width of the beam 10 and is therefore sufficient to accommodate limited adjustment of the beam 10 about a vertical axis within the limits defined by the space between these bolts. The beam 10 is therefore adjustable with respect to the tool beam 2, as indicated clearly in dotted lines in Figure 2. It should also be clear when such an adjustment is made of the beam 10 with respect to the beam 2 that the lateral spacing between the front furrow wheel 9, the land wheel 11, and the rear furrow wheel 20 is altered. The purpose of this relative adjustment of the beams 2 and 10 is to cause the diagonal angle assumed by the cutting disks 5 to increase or decrease, thus narrowing or broadening the width of cut of the tools. This adjustment of the land and rear furrow wheel truck with respect to the tool-carrying beam involves no substantial change in the relationship of the land wheel 11 to the rear furrow wheel 20, so that transmission of lifting power from the land wheel to the furrow wheel is maintained unimpaired.

The mechanism by which lifting power is transmitted from the land wheel to front furrow wheel 9 includes an upwardly extending rock arm 36 on a bell crank 37 rockably mounted upon a bracket 38 secured to the side frame bar 3 near its rear end. Arm 36 is pivotally connected by a bar 39 to an arm 40 of a bell crank 41 (see Figure 1) rockably mounted upon the bracket 6. Another arm 42 of bell crank 41 is pivotally connected by a link 43 with a hand lever 44 mounted upon a quadrant 45 secured to the upper end of spindle 8. An adjustment of the height of the front end of the frame with respect to front furrow wheel 9 is accomplished by manipulating the hand lever 44 to slide the spindle 8 within the sleeve 7. Conventional detent mechanism 46 is provided to secure the lever in its adjusted position. Lifting is assisted by a spring 47 connected at its upper end to the quadrant 45 and at its lower end to the plow frame.

The other arm 48 of bell crank 37 is connected to the upper end of a vertically extending thrust link 49. Thrust link 49 is shown in Figures 2 and 3 and in detail in Figures 4 and 5. In Figures 4 and 5, it will be noted that the thrust link 49 includes a main body 50 and at the upper and lower ends thereof ball and socket joints 51 and 52, respectively. The ball and socket joint 51 includes a spherical member 53 provided on the end of arm 48 of the bell crank 37 and secured to the main body 50 of the thrust link by a cap 54. Cap 54 is provided with depending ears 55 having thickened lower portions adapted to be received in grooves 56 in the upper end of the body. The cap is removably secured to the body of the link by a bolt 57 threaded at one end and provided with a nut 58. From an observation of Figure 5, it will be evident that the depth of grooves 56 is such that the thickened lower portions of ears 55 do not engage the bottom thereof. The fit of the ears in the grooves 56 is such as to form a close fit of the cap 54 with the ball 53 and still allow for wear thereof, the joint being tightened merely by tightening the nut 58 to bring the thickened portions of the ears 55 further into the grooves 56. The upper end of the body 50 is notched to provide a seat for the ball 53 on the end of arm 48, and the ball is held in place by cap 54. An opening 59 in the cap 54 permits limited universal movement of the arm 48 with respect to the thrust link 49.

The structure of the ball and socket joint 52 at the lower end of the thrust link is the same as that described for the joint 51, the ball being provided at the end of an arm 60 which is an extension of the crank axle 12 supporting the land wheel 11. Swinging of the crank axle 12 therefore swings the arm 60, which in turn acts through the thrust link 49 to rock the bell crank 37, which in turn acts through bar 39 to rock bell crank 41 and slide spindle 8 in sleeve member 7 to raise and lower the front end of the frame.

As pointed out before, in order to adjust the width of cut of the gang of disks 5, it is necessary to adjust the rear wheel truck by swinging the beam 10 horizontally about its connection to the rear end of tool beam 2, as indicated in dotted lines in Figure 2. This, of course, increases or decreases the lateral distance between land wheel 11 and the front furrow wheel 9 and brings the land wheel end of beam 10 nearer to or removes it further from the tool beam 2 to change the width of cut of the disks 5. This of course involves a change in the lifting connections between the land wheel 11 and the front furrow wheel 9. However, this change is taken up in the thrust link 49, the lower end of the link, for example, having universal movement about the upper ball 53 as a center. The change in position assumed by this thrust link 49 is clearly indicated in dotted lines in Figure 2. Thus lifting power is transmitted to the front furrow wheel through a thrust link which operates throughout the range of adjustment of the beam 10 with respect to the beam 2.

Completing the plow assembly is a draft structure including a draft bar 61 connected at its rear end to the tool beam 2 medially of its end and having its forward end projecting through an opening in the lower portion of a strap secured to and depending from the bar 4. To the forward end of the draft bar 61 is pivotally connected a draft member 62 which is adjustably braced against lateral movement by a brace 63 connected at one end to the member 62 and at its other end to the bar 4. A hitch bar 64 is pivotally connected to the forward end of member 62 for lateral swinging movement and is provided at its forward end with a clevis 65 adapted for connection to a tractor or other draft vehicle. Turning of the tractor is transmitted to the front and rear furrow wheels of the plow to effect steering thereof in a manner which forms no part of the present invention. For a full description thereof reference may be had to copending U. S. application Serial No. 621,042, filed October 8, 1945.

The operation of the novel lifting mechanism of the present invention should be clear from the foregoing description. It should also be understood that while the invention has been described in its preferred embodiment, modifications may be made therein without departing from the spirit of the invention or the scope of the appended claims.

What is claimed is:

1. In an agricultural implement, a supporting frame including a tool-carrying beam, a furrow wheel at the forward end of the beam, a wheeled truck mounted at the rear end of the beam for adjustment with respect thereto about a vertical axis, a land-wheel carried by the truck, lift means deriving power from the land-wheel for raising and lowering the beam and truck with respect thereto including a crank axle supporting the land wheel and pivoted on the truck for swinging movement on a horizontal axis, a rock arm pivoted on the frame on a horizontal axis, a ball at the end of said crank-axle and said rock arm, means operatively connecting said rock arm to said furrow wheel for lifting the frame with respect thereto, and power transmitting means accommodating adjustment of the truck with respect to the frame connecting said crank axle with said rock arm comprising a generally vertically extending thrust link, and a socket at each end of said link adapted to receive said balls and form joints therewith, said link being arranged to transmit motion from the crank-axle to the rock-arm, whereby said frame will be lifted with respect to said furrow wheel simultaneously with lifting of said truck with respect to the land wheel.

2. In an agricultural implement, a supporting frame including a tool-carrying beam, a furrow wheel at the forward end of the frame, a wheeled truck mounted at the rear end of the frame for adjustment with respect thereto about a vertical axis, a land wheel carried by the truck, lift means deriving power from the land wheel for raising and lowering the frame and truck with respect to said land wheel including a crank axle supporting the land wheel and pivoted on the truck for swinging movement on a horizontal axis, a rock arm pivoted on the frame on a horizontal axis, a ball at the end of said crank-axle and said rock-arm, means operatively connecting said rock arm to said furrow wheel for lifting the frame with respect thereto, and universal power transmission means acting in a generally vertical plane connecting said crank-axle with said rock arm and accommodating adjustment of the truck with respect to the frame comprising a generally vertically extending thrust link, a socket at each end of said link adapted to receive said balls and form joints therewith, said link being arranged to transmit motion from the crank-axle to the rock-arm, whereby said frame will be lifted with respect to said furrow wheel simultaneously with lifting of said truck with respect to the land wheel and means for adjusting said sockets to compensate for variations in size of said balls.

ARTHUR A. SCARLETT.
HOWELL N. JAMES.

REFERENCES CITED

The following references are of record in the file of this patent:

UNITED STATES PATENTS

| Number | Name | Date |
| --- | --- | --- |
| 1,472,637 | Dickinson | Oct. 30, 1923 |
| 2,351,369 | Rutter | June 13, 1944 |